United States Patent
Sugiyama

(10) Patent No.: US 10,173,552 B2
(45) Date of Patent: Jan. 8, 2019

(54) SEAT DEVICE FOR VEHICLE

(71) Applicant: TS TECH CO., LTD., Asaka-shi, Saitama (JP)

(72) Inventor: Shinji Sugiyama, Tochigi (JP)

(73) Assignee: TS TECH CO., LTD., Saitama (JP)

(*) Notice: Subject to any disclaimer, the term of this patent is extended or adjusted under 35 U.S.C. 154(b) by 0 days.

(21) Appl. No.: 14/916,103

(22) PCT Filed: Sep. 10, 2014

(86) PCT No.: PCT/JP2014/073873
§ 371 (c)(1),
(2) Date: Mar. 2, 2016

(87) PCT Pub. No.: WO2015/037600
PCT Pub. Date: Mar. 19, 2015

(65) Prior Publication Data
US 2016/0221475 A1    Aug. 4, 2016

(30) Foreign Application Priority Data
Sep. 10, 2013 (JP) .................. 2013-187610

(51) Int. Cl.
*B60N 2/02* (2006.01)
*B60N 2/72* (2006.01)
(Continued)

(52) U.S. Cl.
CPC ............ *B60N 2/0244* (2013.01); *B60N 2/04* (2013.01); *B60N 2/14* (2013.01); *B60N 2/22* (2013.01);
(Continued)

(58) Field of Classification Search
CPC .......... B60N 2/0244; B60N 2/04; B60N 2/14; B60N 2/22; B60N 2/39; B60N 2/72; B60N 2002/022; B60B 2002/0268
See application file for complete search history.

(56) References Cited

U.S. PATENT DOCUMENTS 4,655,505 A * 4/1987 Kashiwamura ........ A47C 7/467
297/284.6
6,122,912 A * 9/2000 Phillips .................. B62D 5/065
60/413
(Continued)

FOREIGN PATENT DOCUMENTS

JP    H04123200 A    4/1992
JP    2007-261522 A    10/2007
(Continued)

OTHER PUBLICATIONS

Machine Translation of JP,2008-174182,A.*
(Continued)

*Primary Examiner* — Jean Paul Cass
(74) *Attorney, Agent, or Firm* — Hamre, Schumann, Mueller & Larson, P.C.

(57) ABSTRACT

A vehicle seat apparatus includes a seat, an actuator, and a controller in which a posture control unit exercises a seat posture control over the actuator based on a lateral acceleration and a steering velocity, to change an orientation of at least a portion of the seat. The posture control unit is configured to activate the seat posture control when a magnitude of the lateral acceleration becomes greater than a first acceleration threshold value, as well as to activate the seat posture control on conditions that the steering velocity has a magnitude greater than a steering velocity threshold value and when the magnitude of the lateral acceleration becomes greater than a second acceleration threshold value of which a magnitude is smaller than the first acceleration (Continued)

threshold value and a direction is laterally opposite to a direction of the steering velocity.

12 Claims, 13 Drawing Sheets

(51) Int. Cl.
    *B60N 2/14*         (2006.01)
    *B60N 2/39*         (2006.01)
    *B60N 2/04*         (2006.01)
    *B60N 2/22*         (2006.01)

(52) U.S. Cl.
    CPC ................. *B60N 2/39* (2013.01); *B60N 2/72* (2013.01); *B60N 2002/022* (2013.01); *B60N 2002/0268* (2013.01)

(56) References Cited

U.S. PATENT DOCUMENTS

| | | | | |
|---|---|---|---|---|
| 8,078,364 | B2* | 12/2011 | Mabuchi ............ | B60N 2/0232 296/65.06 |
| 2002/0029103 | A1* | 3/2002 | Breed ................... | B60N 2/002 701/45 |
| 2002/0185985 | A1* | 12/2002 | Fraser ................. | B60N 2/0244 318/445 |
| 2003/0121704 | A1* | 7/2003 | Breed ................... | B60N 2/002 177/144 |
| 2005/0046253 | A1* | 3/2005 | Hofschulte .......... | B60N 2/0232 297/284.3 |
| 2005/0156457 | A1* | 7/2005 | Breed ................... | B60N 2/002 297/467 |
| 2005/0161278 | A1* | 7/2005 | Harnischfeger ....... | B62D 5/093 180/441 |
| 2007/0203628 | A1* | 8/2007 | Yoshida ............... | B60N 2/0232 701/49 |
| 2007/0276568 | A1* | 11/2007 | Tozu .................... | B60N 2/0244 701/49 |
| 2008/0036252 | A1* | 2/2008 | Breed ..................... | B60J 10/00 297/217.2 |
| 2008/0036580 | A1* | 2/2008 | Breed ............... | B60R 21/01536 340/438 |
| 2008/0177448 | A1* | 7/2008 | Hozumi ............... | B60N 2/0232 701/45 |
| 2013/0275006 | A1* | 10/2013 | Ystueta ............... | B60N 2/0244 701/49 |
| 2014/0225412 | A1* | 8/2014 | Sugiyama ............... | B60N 2/68 297/383 |
| 2016/0009199 | A1* | 1/2016 | Hamabe ................. | B60N 2/028 297/452.18 |
| 2016/0221475 | A1* | 8/2016 | Sugiyama ............... | B60N 2/72 |

FOREIGN PATENT DOCUMENTS

JP      2008-174182 A      7/2008
JP      2013-49357 A      3/2013

OTHER PUBLICATIONS

Machine Translation of JP,2007-261522,A.*
Machine Translation of JP,2013-049357,A.*
International Search Report issued in PCT/JP2014/073873, dated Dec. 2, 2014.
Office Action issued for Japanese Patent Application No. 2017-166614, dated Jun. 26, 2018, 6 pages including English translation.

* cited by examiner

SEAT DEVICE FOR VEHICLE

TECHNICAL FIELD

The present invention relates to a vehicle seat apparatus having a capability of changing an orientation of at least a portion of a seat back in accordance with a state of a vehicle making a turn.

BACKGROUND ART

A car seat apparatus configured such that when a vehicle turns, a seat back plate portion is swiveled to orient toward a turning direction so as not to allow the feature of holding an occupant to be impaired due to a lateral acceleration produced in a direction reverse to the turning direction is hitherto known in the art (e.g., Patent Document 1). According to the invention disclosed in the Patent Document 1, a control exercised is such that the lateral acceleration to be imposed on the car is estimated by computation, and when the lateral acceleration exceeds a predetermined threshold value, the orientation of the seat back plate portion is changed (such a control will be hereinafter referred to as "seat posture control").

CITATION LIST

Patent Literature

Patent Document 1: JP 2013-049357 A

SUMMARY OF INVENTION

However, in cases of abrupt steering operations, such as a sharp-turn steering operation where the steering wheel turned to the right is turned reversely to the left, the lateral acceleration increases abruptly, and thus if the actuation for the seat posture control is started on condition that the lateral acceleration exceeds a predetermined threshold value as proposed in Patent Document 1, the actuation for the seat posture control would disadvantageously be completed too late to achieve a good hold of the occupant.

Against this backdrop, the present invention has been made, and an object pursued herein is to provide a vehicle seat apparatus in which a good hold of an occupant can be achieved.

The present invention proposed in an attempt to achieve the aforementioned object provides a vehicle seat apparatus comprising: a seat including a seat cushion and a seat back; an actuator capable of changing an orientation of at least a portion of the seat; and a controller configured to control the actuator, wherein the controller includes: a lateral acceleration acquisition unit configured to acquire a lateral acceleration; a steering velocity acquisition unit configured to acquire a steering velocity; and a posture control unit configured to exercise a seat posture control over the actuator based on the lateral acceleration acquired by the lateral acceleration acquisition unit and the steering velocity acquired by the steering velocity acquisition unit, to change the orientation of the at least a portion of the seat. The posture control unit is configured: to activate the seat posture control when a magnitude of the lateral acceleration becomes greater than a first acceleration threshold value, as well as to activate the seat posture control when an increase of the lateral acceleration due to a sharp-turn steering operation is predicted.

In general, quick steering operation of a steering wheel of a vehicle may result with high probability in subsequent generation of a great magnitude of the lateral acceleration in a direction opposite to the steering direction of the steering wheel, that is, the turning direction. Therefore, the seat posture control is also activated when an increase of the lateral acceleration due to a sharp-turn steering operation is predicted based on the steering velocity, and thus the actuation according to the seat posture control can be started earlier, so that a good hold of an occupant can be achieved.

In the apparatus described above, the posture control unit may be configured to activate the seat posture control on condition that the steering velocity has a magnitude greater than a steering velocity threshold value and when the magnitude of the lateral acceleration becomes greater than a second acceleration threshold value which is smaller than the first acceleration threshold value and of which a direction is laterally opposite to a direction of the steering velocity.

If the magnitude of the steering velocity is greater than a steering velocity threshold value and the magnitude of the lateral acceleration is smaller than the first acceleration threshold value but becomes greater than the second acceleration threshold value which is smaller than the first acceleration threshold value and of which a direction is laterally opposite to a direction of the steering velocity, an increase of the lateral acceleration due to a sharp-turn steering operation may be predicted. Therefore, the actuation for the seat posture control thus started under this condition means that the actuation for the seat posture control can be started before the magnitude of the lateral acceleration becomes greater than the first acceleration threshold value; consequently, a good hold of an occupant can be achieved.

In the apparatus described above, the second acceleration threshold value may be smaller than a half of the first acceleration threshold value. With this feature, the seat posture control can be started in a timely fashion, so that a good hold can be achieved.

The aforementioned steering velocity threshold value may preferably be in a range of 100 to 150 deg/s. With this feature, the seat posture control can be started in a timely fashion, so that a good hold can be achieved.

Moreover, the posture control unit may be configured to bring the seat posture control to an end when the magnitude of the lateral acceleration becomes smaller than a reset threshold value during the seat posture control.

Furthermore, if a magnitude of the second acceleration threshold value is set to be smaller than a magnitude of the reset threshold value, the seat posture control can be started in a timely fashion, so that a good hold can be achieved.

The steering velocity threshold value may preferably be configured to be variable through an operation of a user. With this configuration, a good feel of being held in the seat as preferred by the user can be realized through a change of the steering velocity threshold value according to the preference of the user. Also, in this embodiment, the controller may include a nonvolatile memory in which the steering velocity threshold value is storable, so that user's settings can be retained therein.

In the apparatus described above, the seat back may include a central portion for allowing a back of an occupant to rest thereagainst, and side portions disposed at left and right sides of the central portion and jutting frontward farther than the central portion. In this embodiment, the actuator may be configured to actuate the central portion, and/or may be configured to actuate the side portions.

In the apparatus describe above, the actuator may be configured to actuate an entire body of the seat back, or may be configured to actuate an entire body of the seat.

In the apparatus described above, the seat back may include a seat back frame and a seat back pad, and a pressure-receiving member may be provided which is supported by the seat back frame at a position rearward of the seat back pad and configured to be movable rearward by a rearward motion load acted on the seat back from an occupant. In this embodiment, the actuator may be configured to actuate the pressure-receiving member.

The lateral acceleration acquisition unit may preferably be configured to acquire the lateral acceleration by computation based on a vehicle velocity and a steering angle.

In an alternative embodiment where the lateral acceleration is acquired from a lateral acceleration sensor, the acquired value of the lateral acceleration can sensitively vary depending on the inclination of the vehicle, or ruts on the road, or the like; in this embodiment, however, the lateral acceleration acquired by computation based on the vehicle velocity and the steering angle is used, and thus any sensitive variation of the lateral acceleration can be restricted and a stable control can be exercised with a simple configuration.

Additionally, in this embodiment, the lateral acceleration acquisition unit may be configured to compute the lateral acceleration GC by:

$$R=(1+AV^2)/(L/\varphi)$$

$$GC=V^2/R$$

where
A: Stability factor, a vehicle-specific constant
L: Wheelbase of a vehicle
$\varphi$: Steering angle
R: Turning radius.

In the apparatus described above, the lateral acceleration acquisition unit may be configured to acquire values of the lateral acceleration from a lateral acceleration sensor, or alternatively, may be configured to acquire values of the lateral acceleration from an electronic control unit provided in a vehicle.

DESCRIPTION OF EMBODIMENTS

Hereafter, one embodiment of the present invention will be described in detail with reference made to the drawings where appropriate. In the following description, a mechanical setup of a car seat as one example of a vehicle seat apparatus will be discussed at the outset, and then a configuration for controlling the posture control mechanism will be discussed.

<Mechanical Setup of Car Seat>

Figure 1:
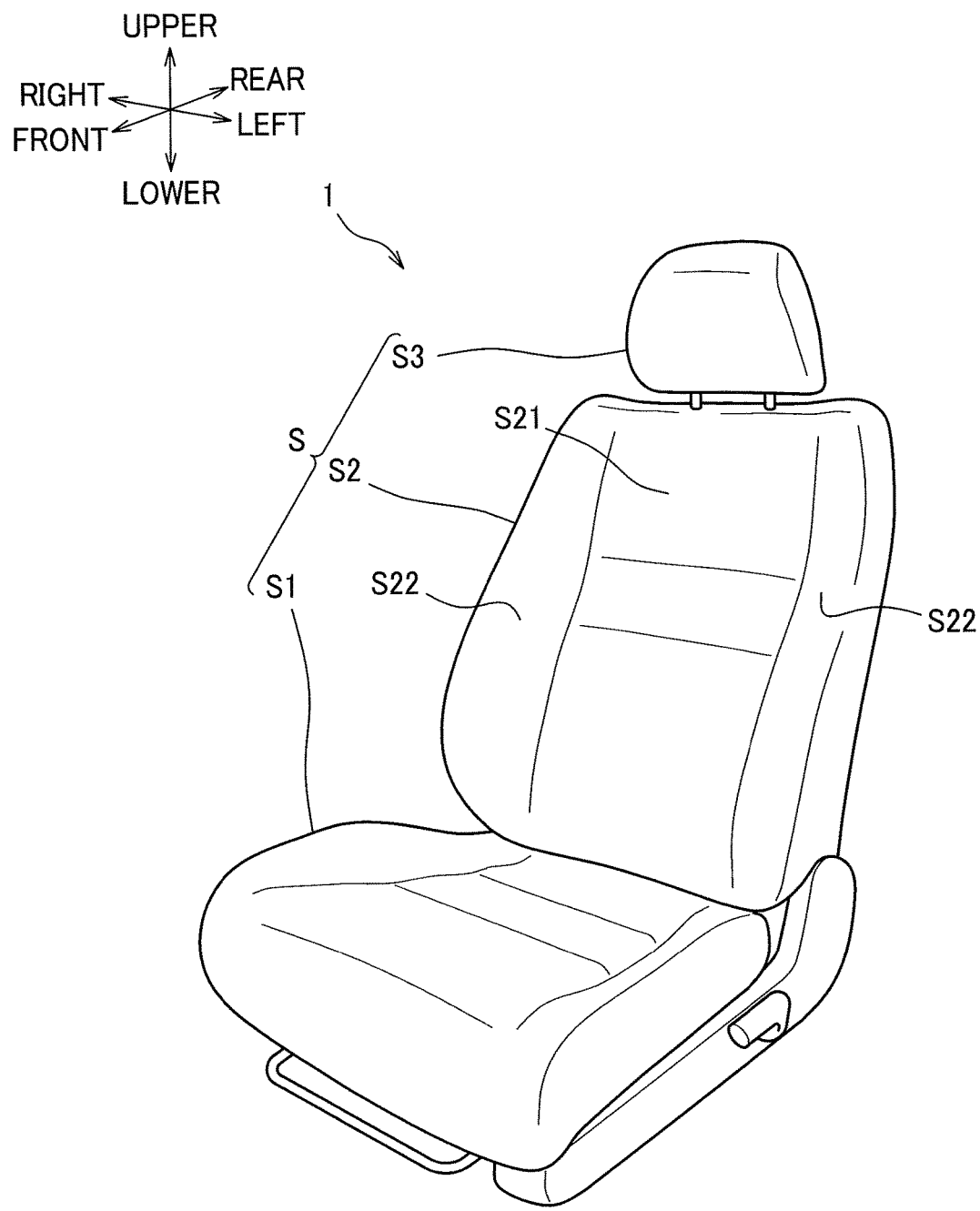
FIG. 1 is a perspective view of a car seat apparatus as an example of a vehicle seat apparatus according to one embodiment.

As shown in FIG. 1, a car seat apparatus 1 is a seat apparatus for use in a driver's seat of an automobile, and mainly comprises a seat S which includes a seat cushion S1, a seat back S2 and a headrest S3. The seat back S2 includes a central portion S21 for allowing a back of an occupant to rest thereagainst, and side portions S22 disposed at left and right sides of the central portion S21 and jutting frontward farther than the central portion S21. It is to be understood that the car seat apparatus 1 may be installed not only in the driver's seat, but also in the passenger seat next to the driver's seat, a rear seat, or any other seat locations.

Figure 2:
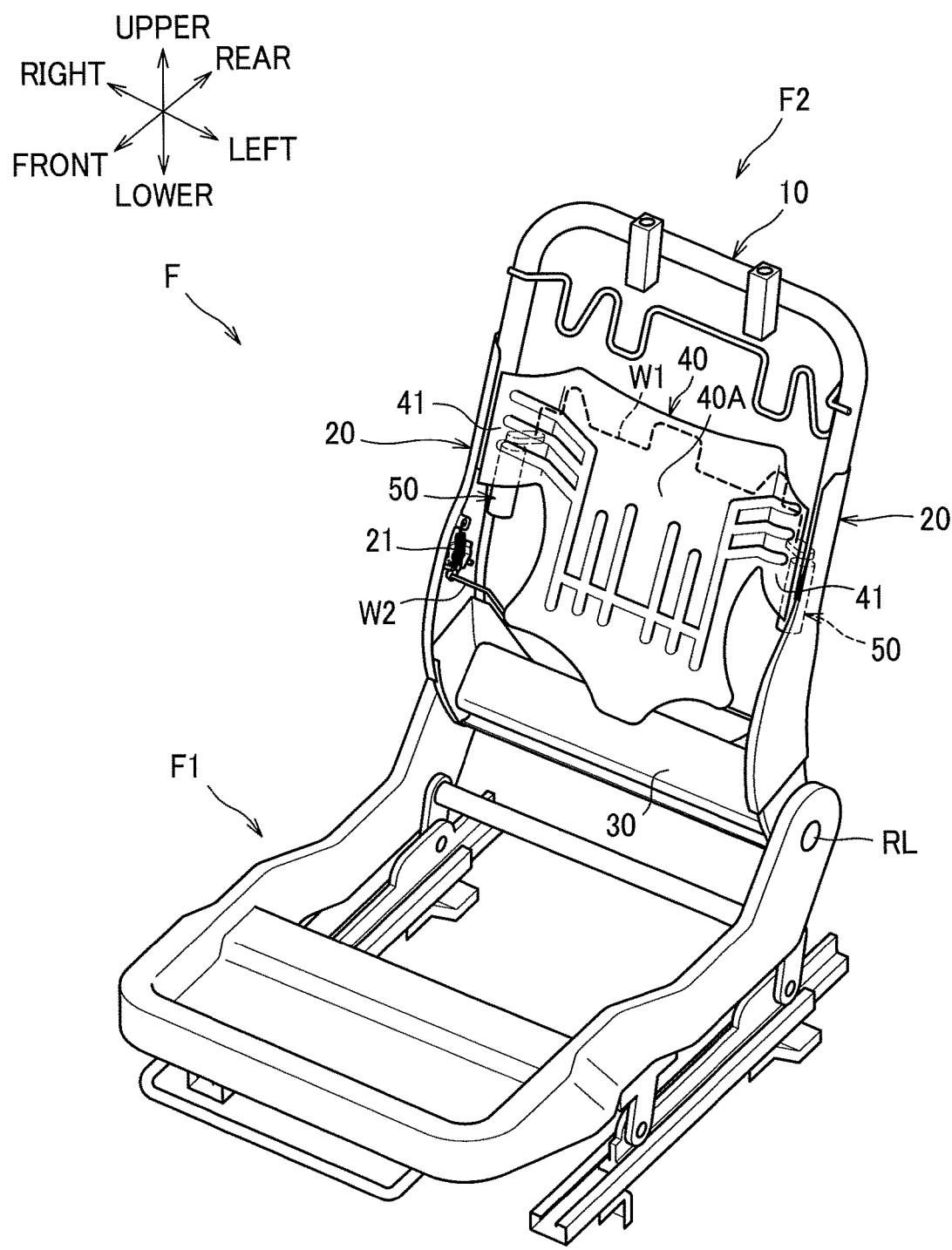
FIG. 2 is a perspective view of a seat frame incorporated in the car seat apparatus.

The seat cushion S1 and the seat back S2 are configured to incorporate a seat frame F as shown in FIG. 2. The seat frame F mainly includes a seat cushion frame F1 constituting a frame of the seat cushion S1, and a seat back frame F2 constituting a frame of the seat back S2. The seat cushion S1 is formed by upholstering the seat cushion frame F1 with a seat cushion pad made of a cushiony material such as urethane foam, and an outer covering material made of synthetic leather, fabric or the like. The seat back S2 is formed by upholstering the seat back frame F2 with a seat back pad made of a cushiony material, and an outer covering material made of synthetic leather, fabric or the like.

The seat back frame F2 has a lower portion thereof pivotally connected via a reclining mechanism RL to a rear portion of the seat cushion frame F1. This allows the seat back S2 to be tilted frontward and rearward relative to the seat cushion S1.

It is to be noted that the directions in this description, i.e., front/rear (frontward/rearward), left/right (leftward/rightward; lateral) and upper/lower (upward/downward), are designated with reference to an occupant seated on the car seat apparatus 1 in its unreclined position such that the seat back S2 is not tilted down by means of the reclining mechanism RL.

The seat back frame F2 is configured to mainly include an upper frame 10, left and right side frames 20 and a lower frame 30, and formed in the shape of a frame with the upper frame 10, the left and right side frames 20 and the lower frame 30 welded or otherwise joined together in one piece. At an inside of this frame-like seat back frame F2, a pressure-receiving member 40 configured to support a back of an occupant and a posture control mechanism 50 configured to change an orientation of the pressure-receiving member 40 to the left and to the right are arranged.

The pressure-receiving member 40 is an elastically deformable plate-like member made of plastic or the like, and disposed rearward of the seat back pad between the left and right side frames 20. To be more specific, the pressure-receiving member 40 includes a pressure-receiving portion 40A for supporting the back of an occupant through the seat back pad, and support portions 41 protruding from left and right end portions of an upper portion of the pressure-receiving portion 40A in laterally-outward-and-frontward-directions. The pressure-receiving portion 40A is located in a position rearward of the central portion S21 of the seat back S2, while the support portions 41 are located in positions rearward of the side portions S22. The support portions 41 serve to support an upper portion of the upper body from left and right side directions.

The pressure-receiving member 40 is engaged with, and supported by an upper connecting wire W1 and a lower connecting wire W2 which are disposed rearward of the pressure-receiving member 40. The upper connecting wire W1 has its both end portions engaged with and supported by the posture control mechanisms 50, and the lower connecting wire W2 has its both end portions engaged with and supported by swing motion mechanisms 21 provided at laterally inner sides of the left and right side frames 20. In this way, the pressure-receiving member 40 is configured to be movable rearward by a rearward motion load acted on the seat back from an occupant.

Figure 5:
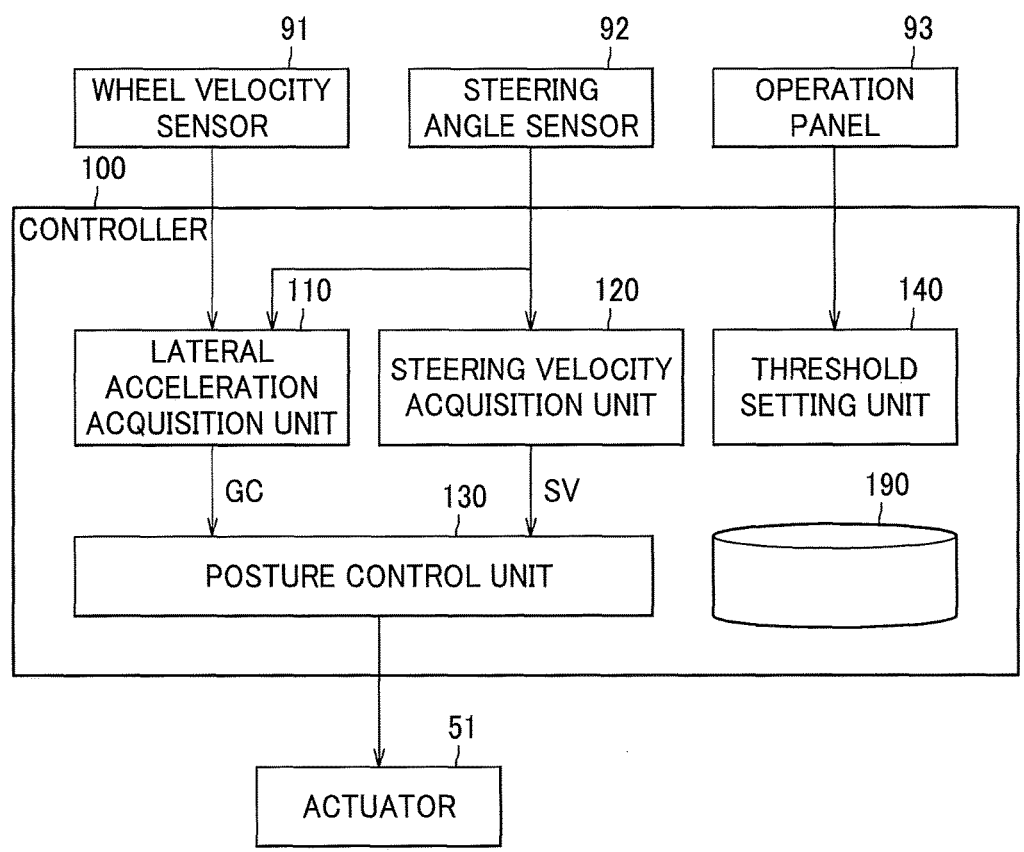
FIG. 5 is a block diagram for explaining a configuration of a controller.

The posture control mechanism 50 is disposed at each of left and right sides of the pressure-receiving member 40, and configured to be capable of changing an orientation of the pressure-receiving member 40 to the left or to the right by pushing frontward and moving the left side portion or the right side portion of the pressure-receiving member 40 under control of the controller 100 (see FIG. 5).

Figure 3:
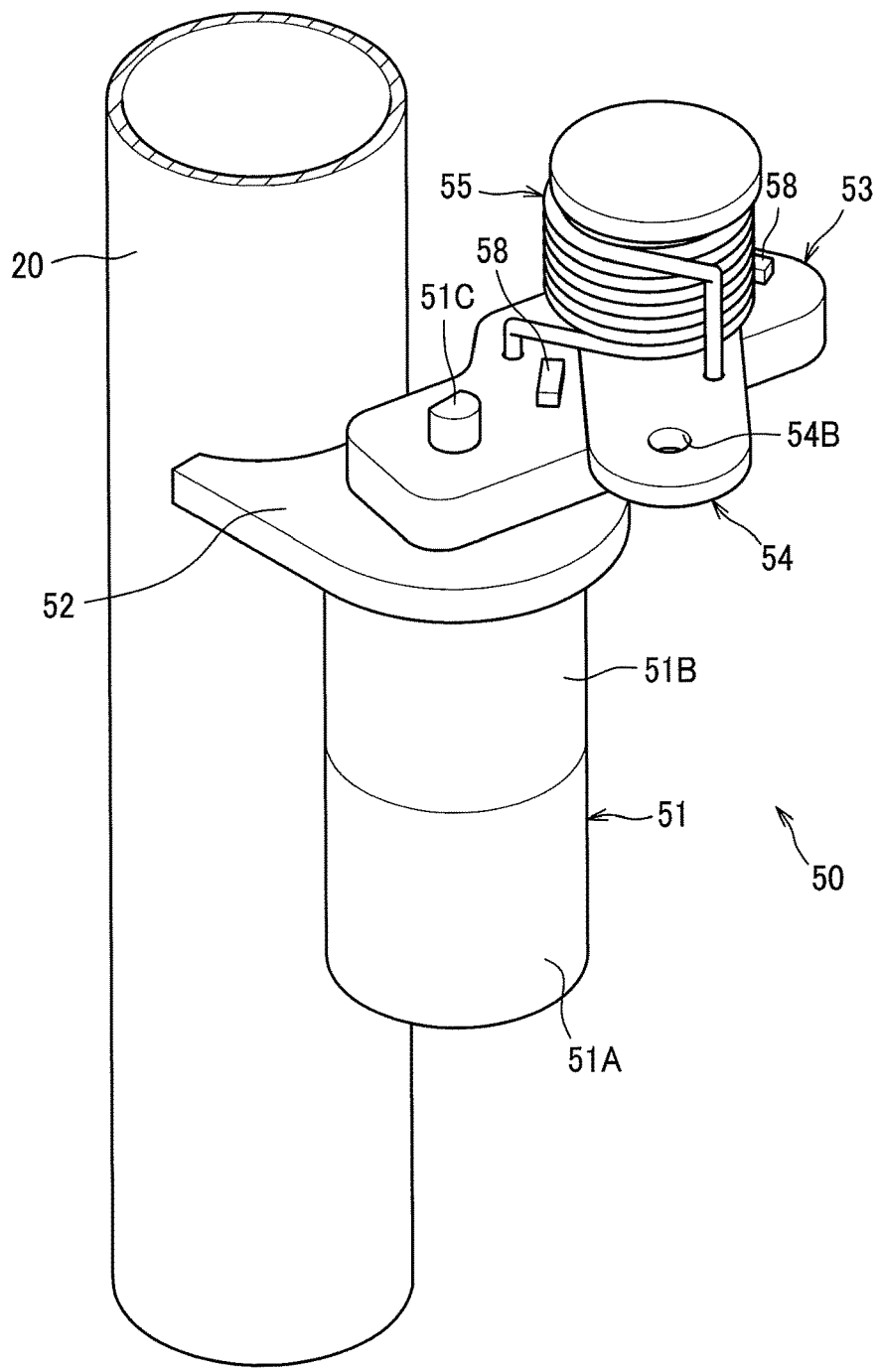
FIG. 3 is an enlarged perspective view of a posture control mechanism.

As shown in FIG. 3, the posture control mechanism 50 mainly includes an actuator 51, a holding bracket 52, a first link member 53, a second link member 54, and a torsion spring 55 as a biasing member.

The actuator 51 is a source of driving power for causing the first link member 53 and the second link member 54 to rotate, and configured to include a stepping motor 51A which can be rotated in normal and reverse directions, a gear box 51B, and an output shaft 51C, wherein the output shaft 51C is disposed to extend along an upward-downward direction. The actuator 51 is fixed to the side frame 20 by the holding bracket 52. The driving power from the stepping motor 51A is transmitted with a speed reduced in the gear box 51B, to the output shaft 51C, to cause the output shaft 51C to rotate.

The first link member 53 is an elongated plate member, and has one end portion thereof fixed to the output shaft 51C of the actuator 51, so that the other end portion thereof can be swung on the output shaft 51C frontward and rearward. On top of the first link member 53, two restricting walls 58 for defining a range of the swinging motion of the second link member 54 are protrusively provided.

The second link member 54 is pivotally connected to the first link member 53. At a distal end portion of the second link member 54, a connecting hole 54B with which the aforementioned end portion of the upper connecting wire W1 is pivotally engaged is formed.

The torsion spring 55 has one end thereof engaged with the first link member 53 and the other end thereof engaged with the second link member 54, to thereby bias the second link member 54 in a clockwise direction as viewed from above with respect to the first link member 53.

In the description given herein, the right posture control mechanism 50 shown in FIG. 3 has been described, and it is to be understood that the left posture control mechanism 50 is bilaterally symmetric to the right posture control mechanism 50.

Figure 4:
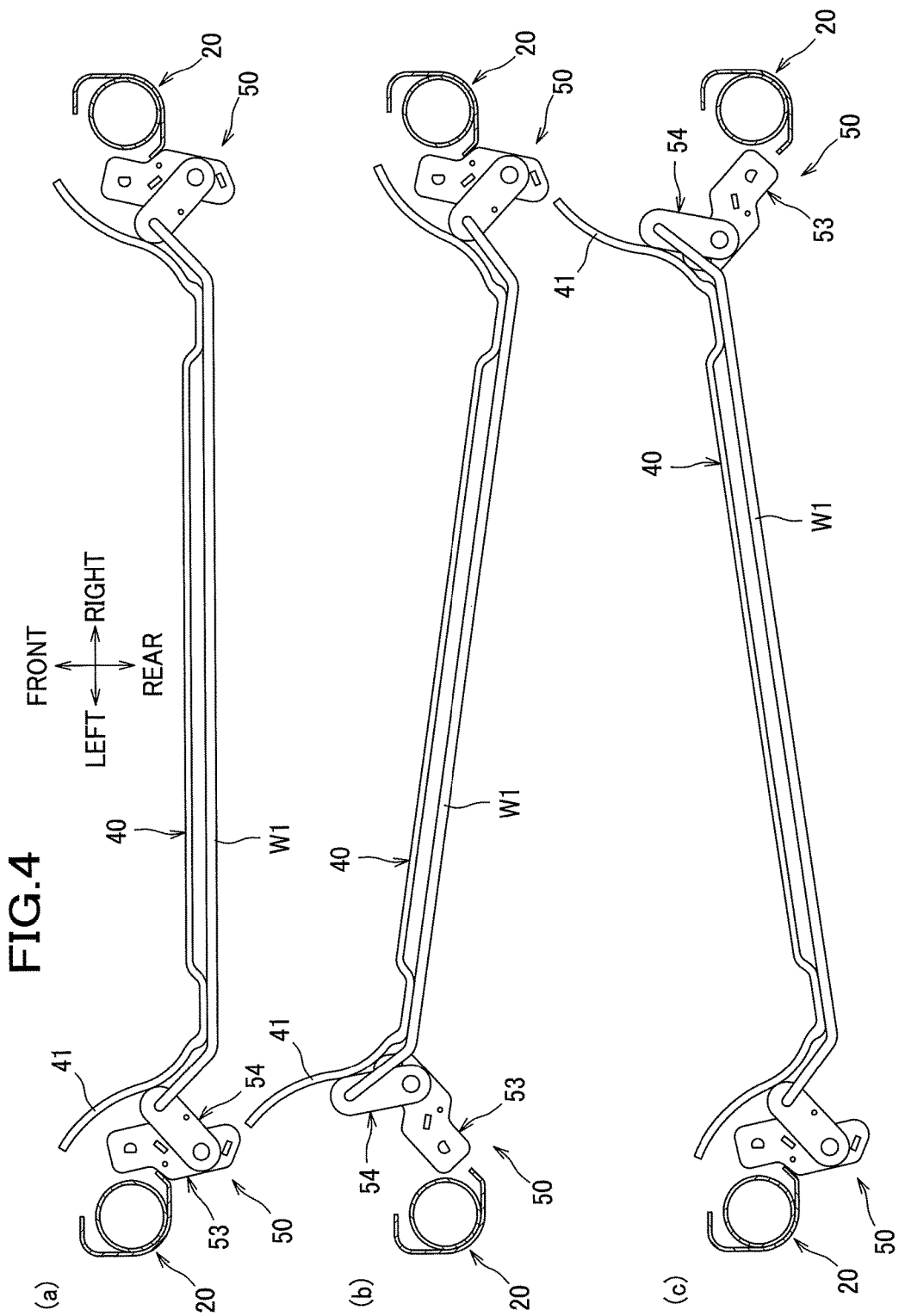
FIG. 4 includes plan views showing operations of the posture control mechanism, in (a) no-turn state, (b) right-turn state, and (c) left-turn state.

The pressure-receiving member 40 in the no-turn state is, as shown in FIG. 4(a), disposed in a rearward position as the left and right posture control mechanisms 50 are not actuated. In the right-turn state as shown in FIG. 4(b), the stepping motor 51A of the left posture control mechanism 50 rotates in the normal direction, the first link member 53 swings frontward, and the pressure-receiving member 40 is caused to orient rightward under control of the controller 100 as will be described later. In the left-turn state as shown in FIG. 4(c), on the other hand, the stepping motor 51A of the right posture control mechanism 50 rotates in the normal direction, the first link member 53 swings frontward, and the pressure-receiving member 40 is caused to orient leftward under control of the controller 100. To restore the posture from the state shown in FIG. 4(b) to the state shown in FIG. 4(a), the stepping motor 51A of the left posture control mechanism 50 is caused to rotate in the reverse direction; to restore the posture from the state shown in FIG. 4(c) to the state shown in FIG. 4(a), the stepping motor 51A of the right posture control mechanism 50 is caused to rotate in the reverse direction. In this way, the posture control mechanism 50 is configured to move the pressure-receiving member 40, thereby moving the central portion S21 and the side portions S22 of the seat back S2.

<Configuration for Control of Posture Control Mechanism>

As shown in FIG. 5, the controller 100 includes a lateral acceleration acquisition unit 110, a steering velocity acquisition unit 120, a posture control unit 130, a threshold setting unit 140, and a storage unit 190, in order to exercise control over the actuator 51 to regulate the lateral orientation of the pressure-receiving member 40. The controller 100 includes a CPU (central processing unit), a ROM (read only memory), a RAM (random access memory) and other modules which are not illustrated in the drawings, and implements the respective units by loading relevant programs pre-stored in the storage unit 190 and executing them.

The lateral acceleration acquisition unit 110 is means for acquiring a lateral acceleration imparted to a car, and is configured in the present embodiment to work out the lateral acceleration GC by computation based on a wheel velocity acquired from a wheel velocity sensor 91 and a steering angle acquired from a steering angle sensor 92. To be more specific, the lateral acceleration GC may be computed by the following equations with a car body velocity V determined from the wheel velocity by a known method and using a stability factor A as a constant specific to the car, a wheel base L of the car, a steering angle $\varphi$, and a turning radius R:

$$R=(1+AV^2)/(L/\varphi)$$

$$GC=V^2/R$$

The steering velocity acquisition unit 120 is means for acquiring a steering velocity, and is configured to compute a steering velocity SV by differentiation (e.g., by finding the differential between the present measurement and the preceding measurement) of the steering angle acquired from the steering angle sensor 92.

It is to be understood that, in the present embodiment, the steering angle $\varphi$ and the steering velocity SV are taken from the angle and velocity of the steering operation of the steering wheel, but may be taken from the angle and velocity of the turning motion of the car wheel(s) if the constants are changed. It is also to be understood that the lateral accelerations GC and the steering velocities SV directed to the right and to the left are represented herein, respectively, by positive and negative values.

The posture control unit 130 is means for exercising a seat posture control over the actuator 51 based on the lateral acceleration GC acquired by the lateral acceleration acquisition unit 110 and the steering velocity SV acquired by the steering velocity acquisition unit 120, to orient the pressure-receiving member 40 in the turning direction. The posture control unit 130 is configure to activate the seat posture control when a magnitude (absolute value) of the lateral acceleration GC becomes greater than a first acceleration threshold value GCth1, as well as to activate the seat posture control on condition that the steering velocity SV has a magnitude (absolute value) greater than a steering velocity threshold value SVth and when the magnitude of the lateral acceleration becomes greater than a second acceleration threshold value GCth2 which is smaller than the first acceleration threshold value GCth1 and of which a direction of the lateral acceleration is opposite to a direction of the steering velocity SV. In other words, the posture control unit 130 is configured to also activate the seat posture control when an increase of the lateral acceleration GC due to a sharp-turn steering operation is predicted. The respective threshold values may be determined in accordance with the characteristics of the car through a test driving; for a typical passenger car, the steering velocity threshold value SVth may preferably be set generally in a range of 100 to 150 deg/s. The second acceleration threshold value GCth2 may preferably be smaller than a half of the first acceleration threshold value GCth1. With this setting, the seat posture control can be started with adequate timing, and a good hold can be achieved accordingly.

Herein, it is assumed that the first acceleration threshold value GCth1 itself is a positive value, and when the lateral acceleration GC should be considered to assume a negative value as in the right-turn state, the magnitude of the lateral acceleration GC being greater than the first acceleration threshold value GCth1 is represented as GC<−GCth1, and other threshold values such as the second acceleration threshold value GCth2 and the steering velocity threshold value SVth are represented similarly in the same situation.

The posture control unit 130 is also configured to bring the seat posture control to an end by reversing the actuator 51, when during the seat posture control, the magnitude of the lateral acceleration GC becomes smaller than a reset threshold value Rth. Herein, the magnitude of the second acceleration threshold value GCth2 is smaller than the magnitude of the reset threshold value Rth. With the second acceleration threshold value GCth2 set on this condition, the seat posture control can be started with adequate timing, and thus a good hold can be achieved.

The threshold setting unit 140 is means for receiving inputs from an operation panel 93 of the car, and writing a steering velocity threshold value SVth in the storage unit 190 as a set value. To be more specific, a user can operate the operation panel 93 and select a preferred magnitude of the steering velocity threshold value SVth from options of Large, Medium, Small, etc. to change the steering velocity threshold value SVth, so that a desired feel of holding can be set.

The storage unit 190 is a device comprising a volatile memory such as a RAM and a nonvolatile memory such as an EEPROM, and configured to store values acquired from the respective sensors, values computed by the respective units, and set values such as threshold values.

One example of process steps of determination of start of actuation for the seat posture control and its execution under control of the controller 100 configured as described above will be described with reference to FIGS. 6 to 8. It is to be understood that flowcharts in FIGS. 6 to 8 each show a series of steps from START to END which forms an iterative process to be repeated. Herein, the control flag FL is set at "0" in a no-turn state when the seat posture control is not executed, at 2 when the pressure-receiving member 40 is turned to the left (i.e., in the left-turn state), and at 1 when the pressure-receiving member 40 is turned to the right (i.e., in the right-turn state). The initial value of the control flag FL is 0.

Figure 6:
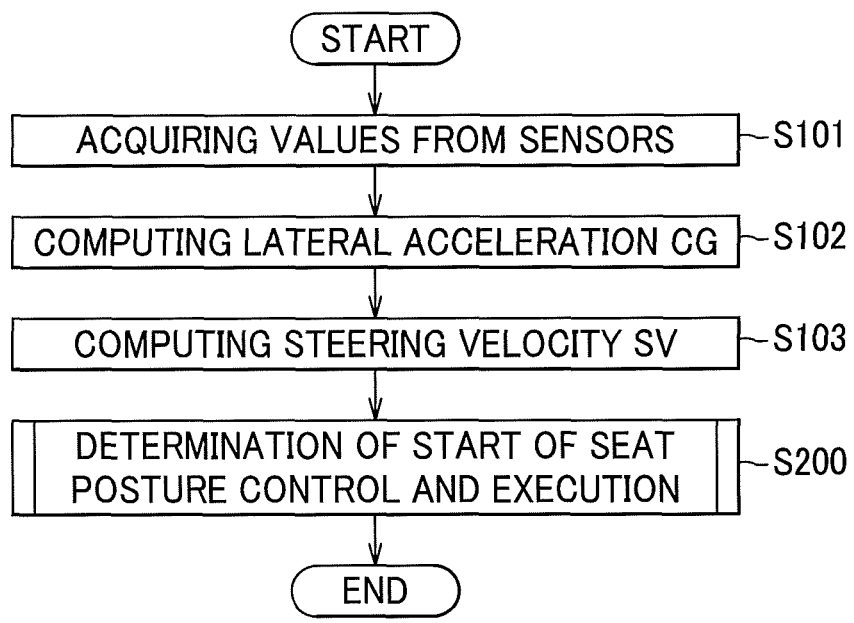
FIG. 6 is a flowchart showing a preliminary process of a seat posture control.

As shown in FIG. 6, the controller 100 is configured to acquire values from the wheel velocity sensor 91 and the steering angle sensor 92 (S101), and the lateral acceleration acquisition unit 110 computes a lateral acceleration GC based on the values of the wheel velocity and the steering angle (S102). The steering velocity acquisition unit 120 computes a steering velocity SV based on the steering angle (S103). The posture control unit 130 then makes a determination as to whether to start the seat posture control, and executes the seat posture control in accordance with the turning direction (S200). To be more specific, if in the right-turn state, then the process of FIG. 7 is executed, while if in the left-turn state, then the process of FIG. 8 is executed.

Figure 7:
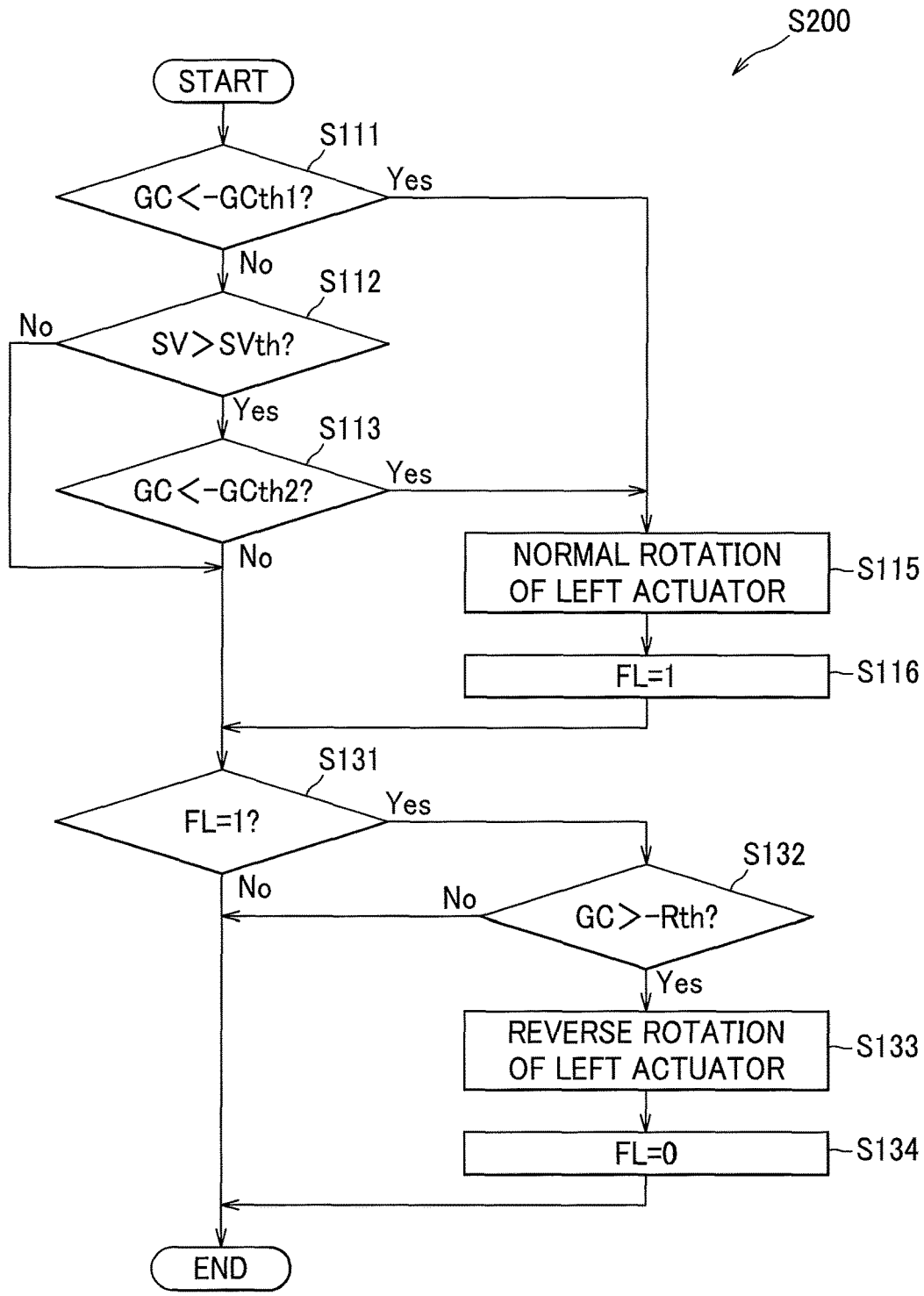
FIG. 7 is a flowchart showing process steps of determination for starting actuation for the seat posture control and execution of the seat posture control during a right-turn operation.
Figure 8:
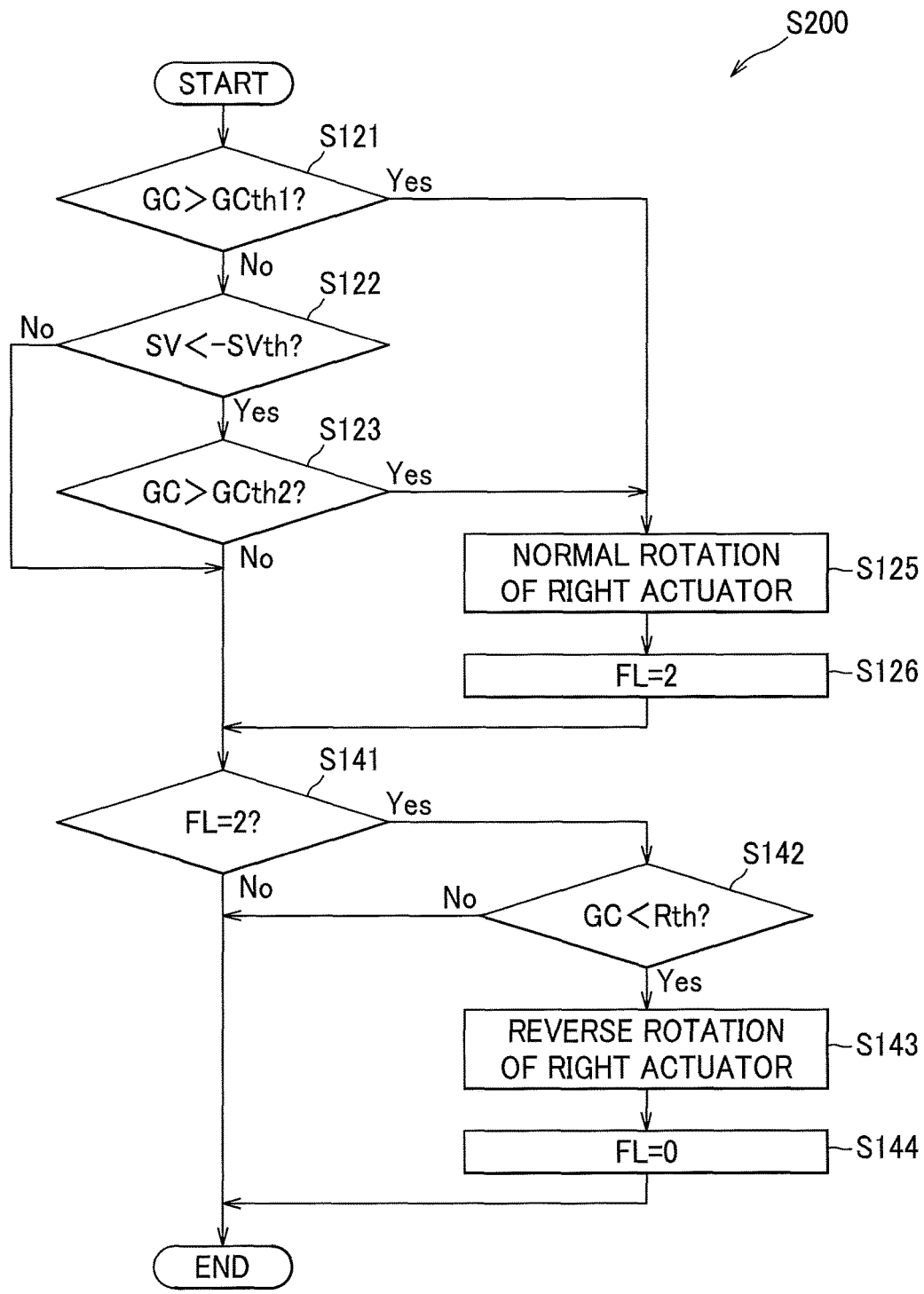
FIG. 8 is a flowchart showing process steps of determination for starting actuation for the seat posture control and execution of the seat posture control during a left-turn operation.

In the right-turn state, as shown in FIG. 7, the posture control unit 130 makes a determination as to whether the lateral acceleration GC is smaller than the first acceleration threshold value GCth1 that is a negative value (i.e., whether the magnitude of the lateral acceleration GC is greater than GCth1), and if smaller (Yes in S111), then the left actuator 51 is caused to rotate in the normal direction (S115), and the pressure-receiving member 40 is turned to the right and the control flag is set at 1 (S116).

On the other hand, even if it is determined in step S111 that the lateral acceleration GC is not smaller than the negative first acceleration threshold value GCth1 (No in S111), the left actuator 51 is caused to rotate in the normal direction (S115), and the pressure-receiving member 40 is turned to the right and the control flag is set at 1 (S116) on conditions that the steering velocity SV is greater than the steering velocity threshold value SVth (Yes in S112) and the lateral acceleration GC is smaller than the negative second acceleration threshold value GCth2 of which the direction is laterally opposite to the direction of the steering velocity SV (i.e., the magnitude of the lateral acceleration GC is greater than the second acceleration threshold value GCth2) (Yes in S113). If the determination in step S112 or step S113 results in No, as well as if the seat posture control has been started, then the process goes to step S131.

Thereafter, if the control flag FL is 1 (Yes in S131), i.e., the pressure-receiving member 40 is turned to the right, then the posture control unit 130 makes a determination as to whether the lateral acceleration GC is greater than the reset threshold value Rth that is a negative value (i.e., whether the magnitude of the lateral acceleration GC is smaller than the reset threshold value Rth), and if greater (Yes in S132), then the left actuator 51 is caused to rotate in the reverse direction (S133), and the pressure-receiving member 40 is restored to the no-turn state and the control flag FL is set at 0 (S134). On the other hand, if the control flag FL is not 1 (No in S131), as well as if the lateral acceleration GC is not greater than the negative reset threshold value Rth (No in S132), then the process comes to an end without changing the control flag FL.

In the left-turn state, as shown in FIG. 8, the posture control unit 130 makes a determination as to whether the lateral acceleration GC is greater than the first acceleration threshold value GCth1, and if greater (Yes in S121), then the right actuator 51 is caused to rotate in the normal direction (S125), and the pressure-receiving member 40 is turned to the left and the control flag is set at 2 (S126).

On the other hand, even if it is determined in step S121 that the lateral acceleration GC is not greater than first acceleration threshold value GCth1 (No in S121), the right actuator 51 is caused to rotate in the normal direction (S125), and the pressure-receiving member 40 is turned to the left and the control flag is set at 2 (S126) on conditions that the steering velocity SV is smaller than the negative steering velocity threshold value SVth (i.e., the magnitude of the steering velocity SV is greater than the steering velocity threshold value SVth) (Yes in S122) and the lateral acceleration GC is greater than the positive second acceleration threshold value GCth2 such that the direction of the lateral acceleration is opposite to the direction of the steering velocity SV (Yes in S123). If the determination in step S122 or step S123 results in No, as well as if the seat posture control has been started, then the process goes to step S141.

Thereafter, if the control flag FL is 2 (S141), then the posture control unit 130 makes a determination as to whether the lateral acceleration GC is smaller than the reset threshold value Rth, and if smaller (Yes in S142), then the right actuator 51 is caused to rotate in the reverse direction (S143), and the pressure-receiving member 40 is restored to the no-turn state and the control flag FL is set at 0 (S144). On the other hand, if the control flag FL is not 2 (No in S141), as well as if the lateral acceleration GC is not greater than the negative reset threshold value Rth (No in S142), then the process comes to an end without changing the control flag FL.

Figure 9:
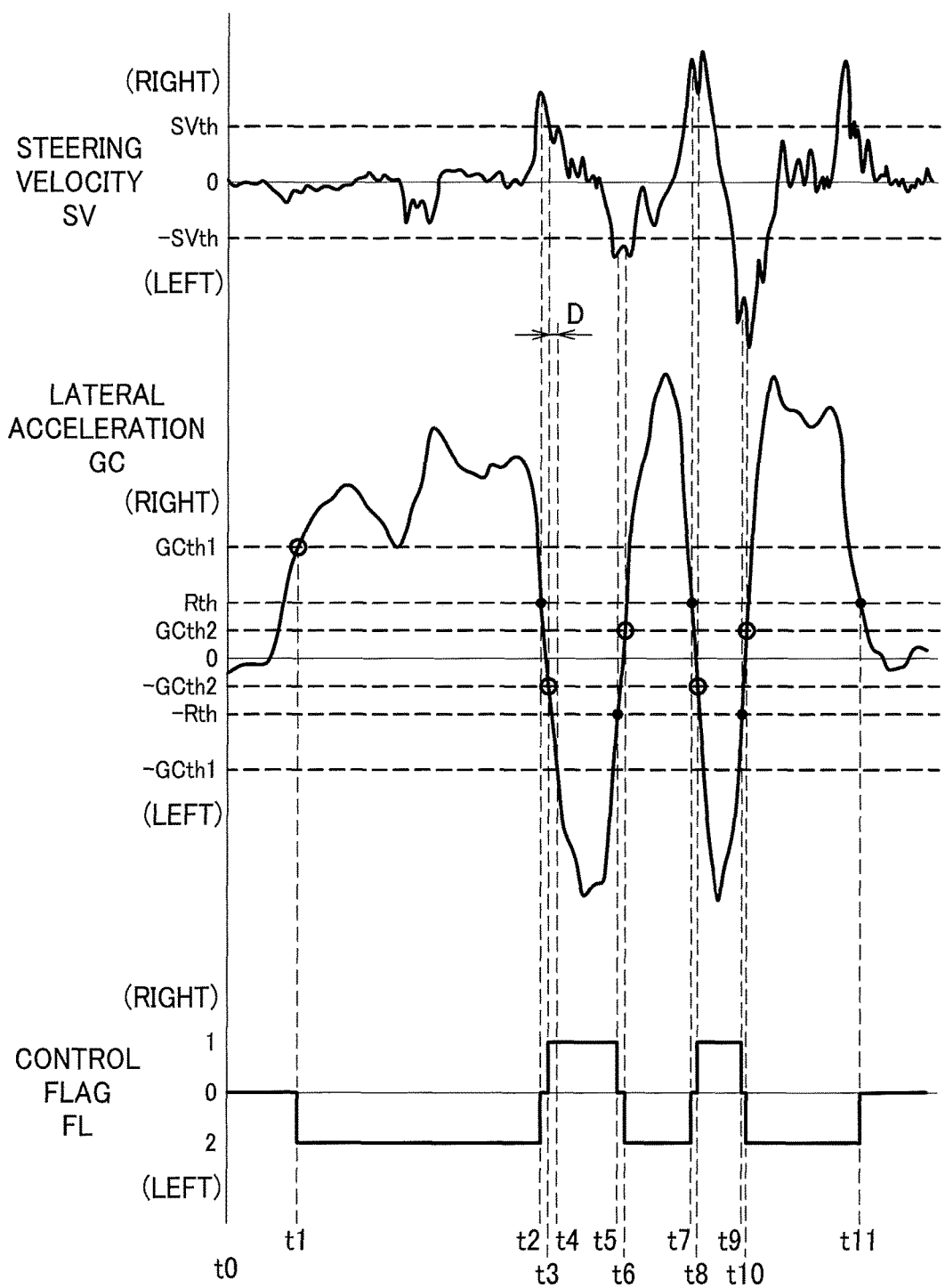
FIG. 9 is a timing chart showing a steering velocity, a lateral acceleration and a control flag, during a travel of a car.

According to the process as described above, for example, the car seat apparatus 1 operates as shown in FIG. 9. FIG. 9 represents the changes of the steering velocity SV, the lateral acceleration GC and the control flag FL observed when a car makes one complete circuit of the course.

As shown in FIG. 9, when the car starts driving at a time t0 on a straight section of the course, and enters a long and fast-track leftward-curved section a short while before a time t1, though the change in the steering velocity SV is small, the rightward lateral acceleration GC increases and becomes greater than the first acceleration threshold value GCth1 (at the time t1); at that time, the pressure-receiving member 40 is turned to orient to the left. Thereafter, when at a time t2, the lateral acceleration GC becomes smaller than the reset threshold value Rth, the pressure-receiving member 40 is restored to the original position.

As the rightward-curved section starts around a time past the time t2, the driver operates the steering wheel back to the right from a time a short while before that time t2, that is, from a location short of the end of the leftward-curved section. For this reason, around the time t2, the steering velocity SV crosses SVth. While the steering velocity SV remains greater than the steering velocity threshold value SVth, additionally, when the lateral acceleration GC becomes smaller than the negative second acceleration threshold value GCth2 (at a time t3), the pressure-receiving member 40 is turned to orient to the right.

Next, at a time t5, when the lateral acceleration becomes greater than the negative threshold value Rth, the pressure-receiving member 40 is restored to the original position. As the leftward-curved section starts around a time past the time t5, the driver operates the steering wheel back to the left from a time short while before that time t5, that is, from a location short of the end of the rightward-curved section. For this reason, around the time t5, the steering velocity SV crosses the negative steering velocity threshold value SVth to the negative side. While the steering velocity SV remains at the negative side of the negative SVth, additionally, when the lateral acceleration GC becomes greater than the second acceleration threshold value GCth2 (at a time t6), the pressure-receiving member 40 is turned to orient to the left.

Similarly, from a time t7 to a time t8, and from a time t9 to a time t10, the sharp-turn steering operation from the left to the right and the sharp-turn steering operation from the right to the left are performed, respectively, and thus the pressure-receiving member 40 is restored to the original position at the time t7, turned to orient to the right at the time t8, restored to the original position at the time t9, and turned to orient to the left at the time t10.

Lastly, when the car drives from a leftward-curved section to a straight section of the course, the steering wheel is operated back to the original position, and thus the steering velocity SV becomes greater to the right, and the lateral acceleration GC does not become greater to the left. Accordingly, at a time t11, the pressure-receiving member 40 is restored to the original position, but afterward not turned to orient to the right.

In the prior art, the actuation for the seat posture control is started only after the lateral acceleration GC crosses a predetermined acceleration (corresponding to the first acceleration threshold value GCth1), and thus the first sharp-turn steering operation results in start of the actuation for the seat posture control at the time t4; however, in the present embodiment, based on the quick steering velocity SV due to the sharp-turn steering operation, subsequent generation of a large lateral acceleration GC is predicted, so that the actuation for the seat posture control can be started at the time t3. Therefore, the actuation for the seat posture control can be started earlier than the prior-art configuration by an amount of time indicated by character D in FIG. 9, so that the occupant can be held adequately.

Moreover, the conditions imposed hereon relates not only to the steering velocity SV but also to the lateral acceleration GC of which the magnitude becomes greater than the second acceleration threshold value GCth2 such that a direction of the lateral acceleration GC is laterally opposite to a direction of the steering velocity SV; therefore, even if the steering velocity SV temporarily becomes great when the car drives from a curved section to a straight section of the course, the seat posture control will never be activated.

As described above, with the car seat apparatus 1 according to the present invention, in cases of abrupt steering operations, such as a sharp-turn steering operation, the actuation according to the seat posture control can be started earlier, so that a good hold of an occupant can be achieved.

Moreover, since the car seat apparatus 1 is configured such that the steering velocity threshold value SVth is variable through an operation of a user, a feel of being held in the seat as preferred by the user can be realized.

Furthermore, since in the car seat apparatus 1, the lateral acceleration acquisition unit 110 is configured to acquire a lateral acceleration by computation based on the wheel velocity and the steering angle, a stable control can be exercised without undergoing a sensitive change of the lateral acceleration with a simple configuration.

Although the embodiment of the present invention has been described above, the present invention is not limited to the above-described embodiment, and can be implemented with any appropriate modifications made thereto.

For example, the above-described embodiment is configured to cause the pressure-receiving member 40 disposed in the seat back S2 shown in FIG. 1 at a position rearward of the central portion S21 (for allowing a back of an occupant to rest thereagainst) to change its orientation to the left or to the right so that a feel of the occupant being held therein can be improved, but can alternatively be configured to cause the side portions S22 of the seat back S2 to change their orientations to the left or to the right so that the feel of the occupant being held therein can be improved as well.

Figure 10:
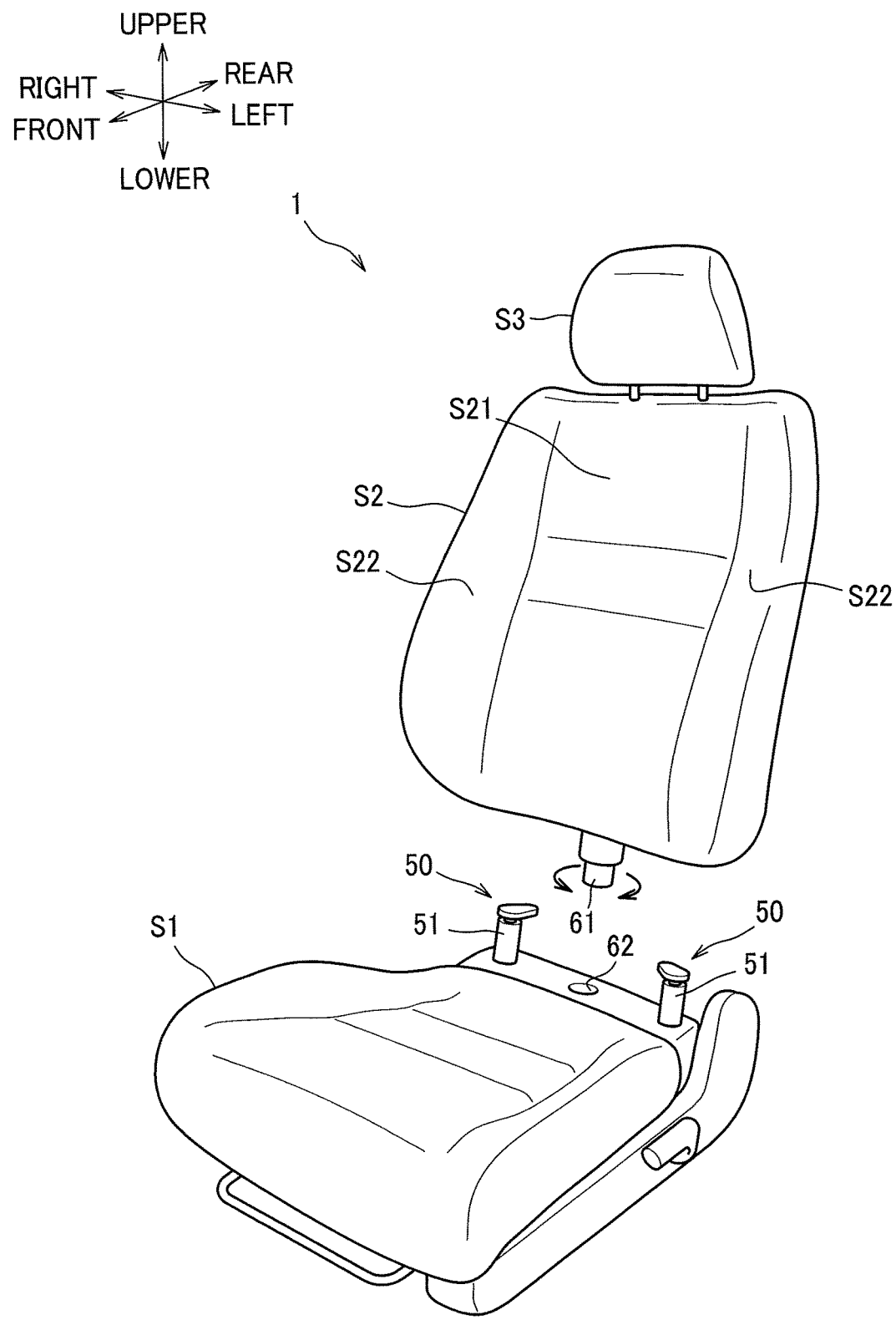
FIG. 10 is an exploded perspective view of a seat apparatus according to a first modified embodiment.

As in the first modified embodiment illustrated in FIG. 10, an alternative configuration may be feasible in which the entire body of the seat back S2 is actuated by the actuator 51. For example, a pivot shaft 61 extending downward may be provided at a lower end of the seat back S2, and a bearing portion 62 which allows the pivot shaft 61 to be pivotally supported therein is provided at the seat cushion S1, so that the seat back S2 is provided in such a manner as to swivel to the left and to the right relative to the seat cushion S1. Herein, posture control mechanisms 50 (actuators 51) are provided at the left and right sides of the rear portion of the seat cushion S1 so that the entire body of the seat back S2 can be actuated by causing the left and right posture control mechanisms 50 to push appropriate locations of the seat back S2 frontward. With this alternative configuration as well, a good hold of the occupant can be realized.

Figure 11:
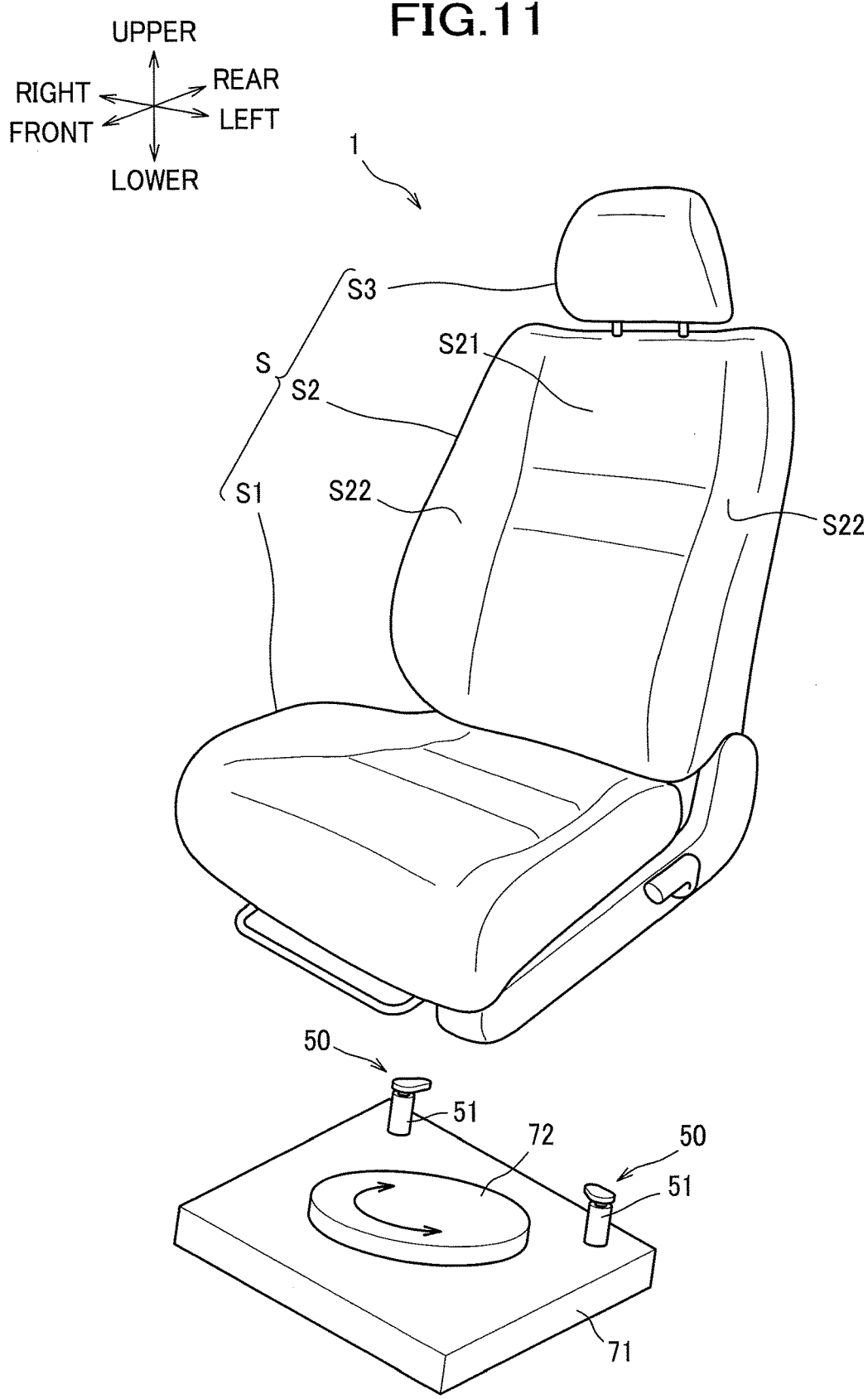
FIG. 11 is an exploded perspective view of a seat apparatus according to a second modified embodiment.

As in the second modified embodiment illustrated in FIG. 11, another alternative configuration may be feasible in which the entire body of the seat S is actuated by the actuator 51. For example, a mount 71 for supporting the seat S is provided under the seat S, and a swivel table 72 provided on the mount 71. The seat S is fixed on the swivel table 72. Herein, posture control mechanisms 50 (actuators 51) are provided at the left and right sides of the rear portion of the mount 71 so that the entire body of the seat S can be actuated by causing the left and right posture control mechanisms 50 to push appropriate locations of the seat cushion S1 frontward. With this alternative configuration as well, a good hold of the occupant can be realized.

Figure 12:
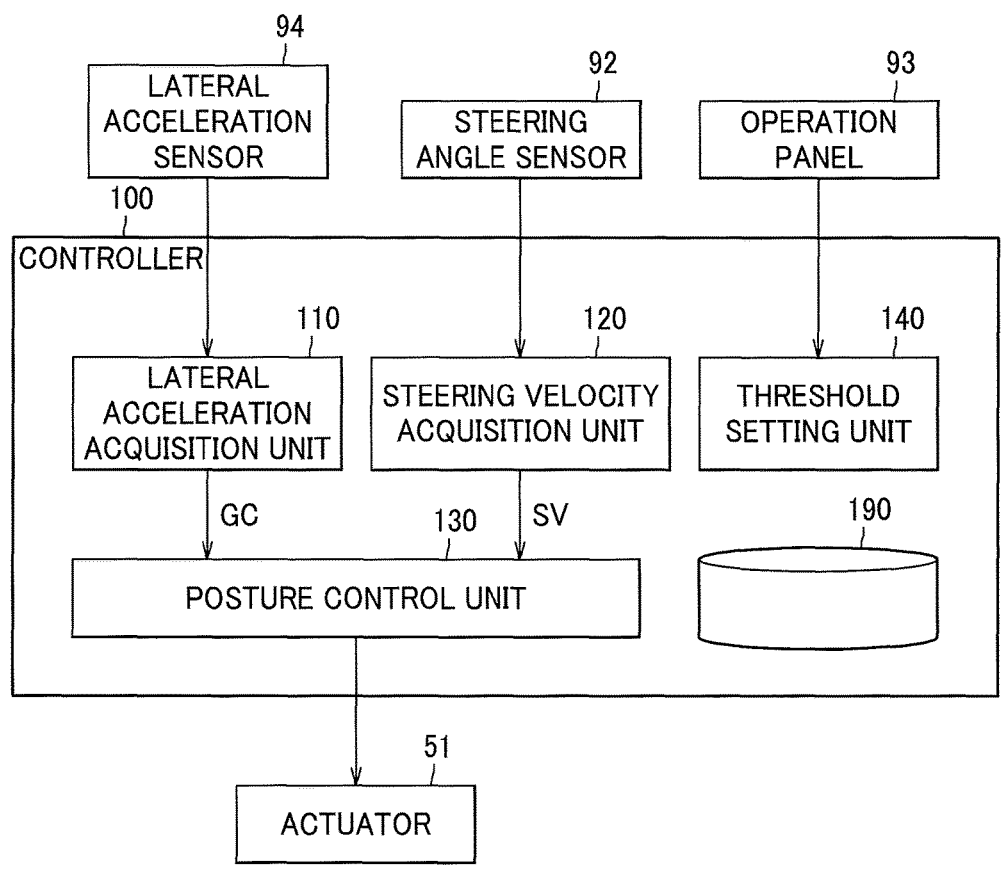
FIG. 12 is a block diagram of a controller in a seat apparatus according to a third modified embodiment.
Figure 13:
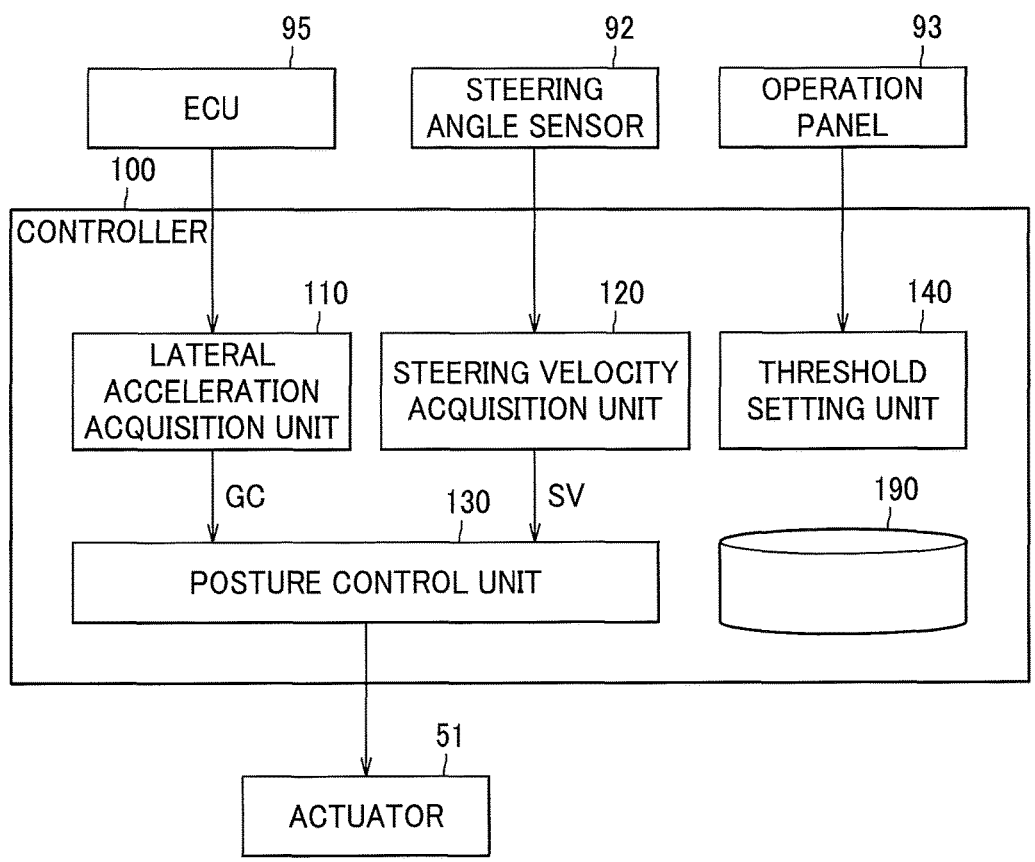
FIG. 13 is a block diagram of a controller in a seat apparatus according to a fourth modified embodiment.

In the above-described embodiment, the lateral acceleration is acquired by computation based on the wheel velocity and the steering angle, but may alternatively be acquired from a lateral acceleration sensor 94 as in the third modified embodiment illustrated in FIG. 12. The lateral acceleration and the steering velocity may be acquired, if an electronic control unit provided in the car is available, by interrogating the electronic control unit (ECU) 95 as in the fourth embodiment illustrated in FIG. 13.

In the above-described embodiment, an increase of the lateral acceleration due to a sharp-turn steering operation is predicted based on the steering velocity and the lateral acceleration; however, the lateral acceleration due to the sharp-turn steering operation may be predicted based not on the lateral acceleration but on the steering velocity.

In the above-described embodiments, the car seat apparatus 1 for use in an automobile is illustrated as an example of the vehicle seat apparatus, but the present invention is not limited thereto, and is also applicable to any other vehicle seat apparatuses for use, for example, in snowmobile, ships and aircrafts, etc.

The invention claimed is:

1. A vehicle seat apparatus comprising:
   a seat including a seat cushion and a seat back, the seat back including a shaft, and
   the seat cushion including a bearing portion configured to allow the shaft to be rotatably supported therein, wherein the seat back is configured to be capable of swiveling to a left or to a right relative to the seat cushion;
   an actuator capable of changing an orientation of an entire body of the seat back to the left or to the right relative to the seat cushion; and
   a controller configured to control the actuator,
   wherein the controller includes:
      a lateral acceleration acquisition unit configured to acquire a lateral acceleration;
      a steering velocity acquisition unit configured to acquire a steering velocity; and
      a posture control unit configured to exercise a seat posture control over the actuator based on the lateral acceleration acquired by the lateral acceleration acquisition unit and the steering velocity acquired by the steering velocity acquisition unit, to change the orientation of the entire body of the seat back to the left or to the right relative to the seat cushion,
   the posture control unit is configured:
      to activate the seat posture control when a magnitude of the lateral acceleration becomes greater than a first acceleration threshold value, as well as
      to activate the seat posture control on conditions that the steering velocity has a magnitude greater than a steering velocity threshold value and a direction of the lateral acceleration is opposite to a direction of the steering velocity and when the magnitude of the lateral acceleration becomes greater than a second acceleration threshold value which is smaller than the first acceleration threshold value,
   the actuator is configured to move an entire assembly of the seat cushion and the seat back of the vehicle seat relative to a vehicle in which the vehicle seat is installed,
   the lateral acceleration acquisition unit is configured to acquire the lateral acceleration by computation based on a vehicle velocity and a steering angle,
   the lateral acceleration acquisition unit is configured to compute the lateral acceleration GC by:

$$R=(1+AV^2)/(L/\varphi)$$

$$GC=V^2/R$$

where
      A: Stability factor, a vehicle-specific constant
      V: Vehicle velocity
      L: Wheelbase of a vehicle
      $\varphi$: Steering angle
      R: Turning radius, and
   the seal cushion is configured to be adjusted based on the lateral acceleration formula $R=(1+AV^2)/(L/\varphi)$.

2. The vehicle seat apparatus according to claim 1, wherein the second acceleration threshold value is smaller than a half of the first acceleration threshold value.

3. The vehicle seat apparatus according to claim 1, wherein the steering velocity threshold value is in a range of 100 to 150 deg/s.

4. The vehicle seat apparatus according to claim 1, wherein the posture control unit is configured to bring the seat posture control to an end when the magnitude of the lateral acceleration becomes smaller than a reset threshold value during the seat posture control.

5. The vehicle seat apparatus according to claim 4, wherein a magnitude of the second acceleration threshold value is smaller than a magnitude of the reset threshold value.

6. The vehicle seat apparatus according to claim 1, wherein the steering velocity threshold value is variable through an operation of a user.

7. The vehicle seat apparatus according to claim 6, wherein the controller includes a nonvolatile memory in which the steering velocity threshold value is storable.

8. The vehicle seat apparatus according to claim 1, wherein the seat back includes a central portion for allowing a back of an occupant to rest thereagainst, and side portions disposed at left and right sides of the central portion and jutting frontward farther than the central portion, and
    wherein the actuator is configured to actuate the central portion.

9. The vehicle seat apparatus according to claim 1, wherein the seat back includes a central portion for allowing a back of an occupant to rest thereagainst, and side portions disposed at left and right sides of the central portion and jutting frontward farther than the central portion, and
    wherein the actuator is configured to actuate the side portions.

10. The vehicle seat apparatus according to claim 1, wherein the seat back includes a seat back frame and a seat back pad,
    wherein the vehicle seat apparatus further comprises a pressure-receiving member supported by the seat back frame at a position rearward of the seat back pad, and configured to be movable rearward by a rearward motion load acted on the seat back from an occupant, and
    wherein the actuator is configured to actuate the pressure-receiving member.

11. The vehicle seat apparatus according to claim 1, wherein the lateral acceleration acquisition unit is configured to acquire values of the lateral acceleration from a lateral acceleration sensor.

12. The vehicle seat apparatus according to claim 1, wherein the lateral acceleration acquisition unit is configured to acquire values of the lateral acceleration from an electronic control unit provided in a vehicle.

* * * * *